United States Patent
Aoyama et al.

(10) Patent No.: US 10,236,739 B2
(45) Date of Patent: Mar. 19, 2019

(54) ELECTRIC WORKING MACHINE

(71) Applicant: MAKITA CORPORATION, Anjo-shi, Aichi (JP)

(72) Inventors: Kiyoshi Aoyama, Anjo (JP); Masanori Higashi, Anjo (JP); Takashi Momose, Anjo (JP)

(73) Assignee: MAKITA CORPORATION, Anjo (JP)

( * ) Notice: Subject to any disclaimer, the term of this patent is extended or adjusted under 35 U.S.C. 154(b) by 388 days.

(21) Appl. No.: 14/887,652

(22) Filed: Oct. 20, 2015

(65) Prior Publication Data

US 2016/0141932 A1    May 19, 2016

(30) Foreign Application Priority Data

Nov. 14, 2014 (JP) .................................. 2014-231480

(51) Int. Cl.
| | | |
|---|---|---|
| H02K 3/28 | (2006.01) | |
| H02K 3/18 | (2006.01) | |
| H02K 21/22 | (2006.01) | |
| H02K 7/14 | (2006.01) | |

(52) U.S. Cl.
CPC ................. *H02K 3/28* (2013.01); *H02K 3/18* (2013.01); *H02K 7/145* (2013.01); *H02K 21/22* (2013.01)

(58) Field of Classification Search
CPC .................................. H02K 3/28; H02K 3/18
See application file for complete search history.

(56) References Cited

U.S. PATENT DOCUMENTS

| | | |
|---|---|---|
| 2006/0208605 A1 | 9/2006 | Aoyama et al. |
| 2008/0116755 A1 | 5/2008 | Sahara et al. |
| 2010/0072840 A1 | 3/2010 | Sahara et al. |
| 2013/0313927 A1 | 11/2013 | Laber et al. |

FOREIGN PATENT DOCUMENTS

| | | |
|---|---|---|
| DE | 10 2007 053 342 A1 | 5/2008 |
| JP | 2005-012974 A | 1/2005 |
| JP | 2006-148999 A | 6/2006 |
| JP | 2006-150571 A | 6/2006 |
| JP | 2007-043834 A | 2/2007 |
| JP | 2008-199815 A | 8/2008 |
| JP | 2010-268556 A | 11/2010 |
| JP | 2011-199984 A | 10/2011 |
| JP | 2012-019573 A | 1/2012 |

(Continued)

OTHER PUBLICATIONS

Jan. 20, 2017 Office Action issued in German Patent Application No. 102015014763.3.

(Continued)

*Primary Examiner* — Ramon M Barrera
(74) *Attorney, Agent, or Firm* — Oliff PLC

(57) ABSTRACT

The present application discloses an electric working machine. The electric working machine includes a motor including a stator. The stator includes: a stator core haring a plurality of tooth portions radially extending along a radial direction; and a first coil, a second coil, and a third coil wound on the tooth portions. A start end of the first coil and a finish end of the second coil, a start end of the second coil and a finish end of the third coil, and a start end of the third coil and a finish end of the first coil are led out within a range of 200 degrees from the stator.

9 Claims, 14 Drawing Sheets

(56) References Cited

FOREIGN PATENT DOCUMENTS

| JP | 3181518 U | 2/2013 |
|---|---|---|
| JP | 2013-046479 A | 3/2013 |
| JP | 2013-158144 A | 8/2013 |
| JP | 2013-166209 A | 8/2013 |
| JP | 2014-008027 A | 1/2014 |

OTHER PUBLICATIONS

May 23, 2016 Office Action issued in German Patent Application No. 102015014763.3.
Nov. 14, 2017 Office Action issued in Japanese Patent Application No. 2014-231480.
May 15, 2018 Office Action issued in Japanese Patent Application No. 2014-231480.
Nov. 20, 2018 Office Action issued in Japanese Patent Application No. 2014-231480.

FIG. 12

| U-phase Coil | UV Line → T5 → T8 → T11 → T2 → WU Line |
| V-phase Coil | VW Line → T3 → T12 → T9 → T6 → UV Line |
| W-phase Coil | WU Line → T1 → T10 → T7 → T4 → VW Line |

FIG. 13

| U-phase Coil | UV Line → T5 → T11 → T8 → T2 → WU Line |
| V-phase Coil | VW Line → T3 → T12 → T9 → T6 → UV Line |
| W-phase Coil | WU Line → T1 → T10 → T7 → T4 → VW Line |

FIG. 14

| U-phase Coil | UV Line → T5 → T8 → T11 → T2 → WU Line |
| V-phase Coil | VW Line → T3 → T12 → T9 → T6 → UV Line |
| W-phase Coil | WU Line → T1 → T7 → T10 → T4 → VW Line |

| U-phase Coil | UV Line → | T5 | → | T8 | → | T2 | → | WU Line |
| V-phase Coil | VW Line → | T3 | → | T9 | → | T6 | → | UV Line |
| W-phase Coil | WU Line → | T1 | → | T7 | → | T4 | → | VW Line |

| | | | | | | |
|---|---|---|---|---|---|---|
| U-phase Coil | UV Line → | T5 → | T14 → | T11 → | T8 → | T2 → WU Line |
| V-phase Coil | VW Line → | T3 → | T15 → | T12 → | T9 → | T6 → UV Line |
| W-phase Coil | WU Line → | T1 → | T13 → | T10 → | T7 → | T4 → VW Line |

ELECTRIC WORKING MACHINE

CROSS-REFERENCE TO RELATED APPLICATION(S)

This application claims priority to Japanese Patent Application No 2014-231480 filed on Nov. 14, 2014, the contents of which are hereby incorporated by reference into the present application.

TECHNICAL FIELD

The present application relates to an electric working machine.

DESCRIPTION OF RELATED ART

JP 2006-150571 A discloses an electric working machine. The electric working machine includes a motor having a stator. The stator includes: a stator core having a plurality of tooth portions radially extending along a radial direction; and a first coil, a second coil, and a third coil wound on the tooth portions.

BRIEF SUMMARY OF INVENTION

Conventionally, motor power lines for supplying power to the coils wound on the tooth portions are led out from the stator, with a phase shift by 120 degrees provided between a start end of the first coil and a finish end of the second coil, between a start end of the second coil and a finish end of the third coil, and between a start end of the third coil and a finish end of the first coil. However, in the case of thus leading out the motor power lines from the stator, it is necessary to secure a certain space for arranging the motor power lines inside a housing that contains the motor. The present application provides a technique of reducing the space needed for arranging the motor power lines inside the housing that contains the motor, thereby achieving downsizing of the electric working machine.

The present application discloses an electric working machine. The electric working machine includes a motor including a stator. The stator includes: a stator core having a plurality of tooth portions radially extending along a radial direction and a first coil, a second coil, and a third coil wound on the tooth portions. A start end of the first coil and a finish end of the second coil, a start end of the second coil and a finish end of the third coil, and a start end of the third coil and a finish end of the first coil are led out within a range of 200 degrees from the stator.

In the above electric working machine, motor power lines for supplying power to the first coil, the second coil, and the third coil can be led out, from the stator, within a narrower angle range as compared to a conventional technique. Employing such a configuration reduces a space needed for arranging motor power lines inside a housing containing the motor, whereby downsizing of the electric working machine can be achieved.

BRIEF DESCRIPTION OF DRAWINGS

FIG. 12 is a table showing a winding method for a coil 58 of the bush cutter 2 in the embodiment;

FIG. 13 is a table showing another winding method for the coil 58 of the bush cutter 2 in the embodiment;

FIG. 14 is a table showing still another winding method for the coil 58 of the bush cutter 2 in the embodiment;

DETAILED DESCRIPTION OF INVENTION

Figure 1:
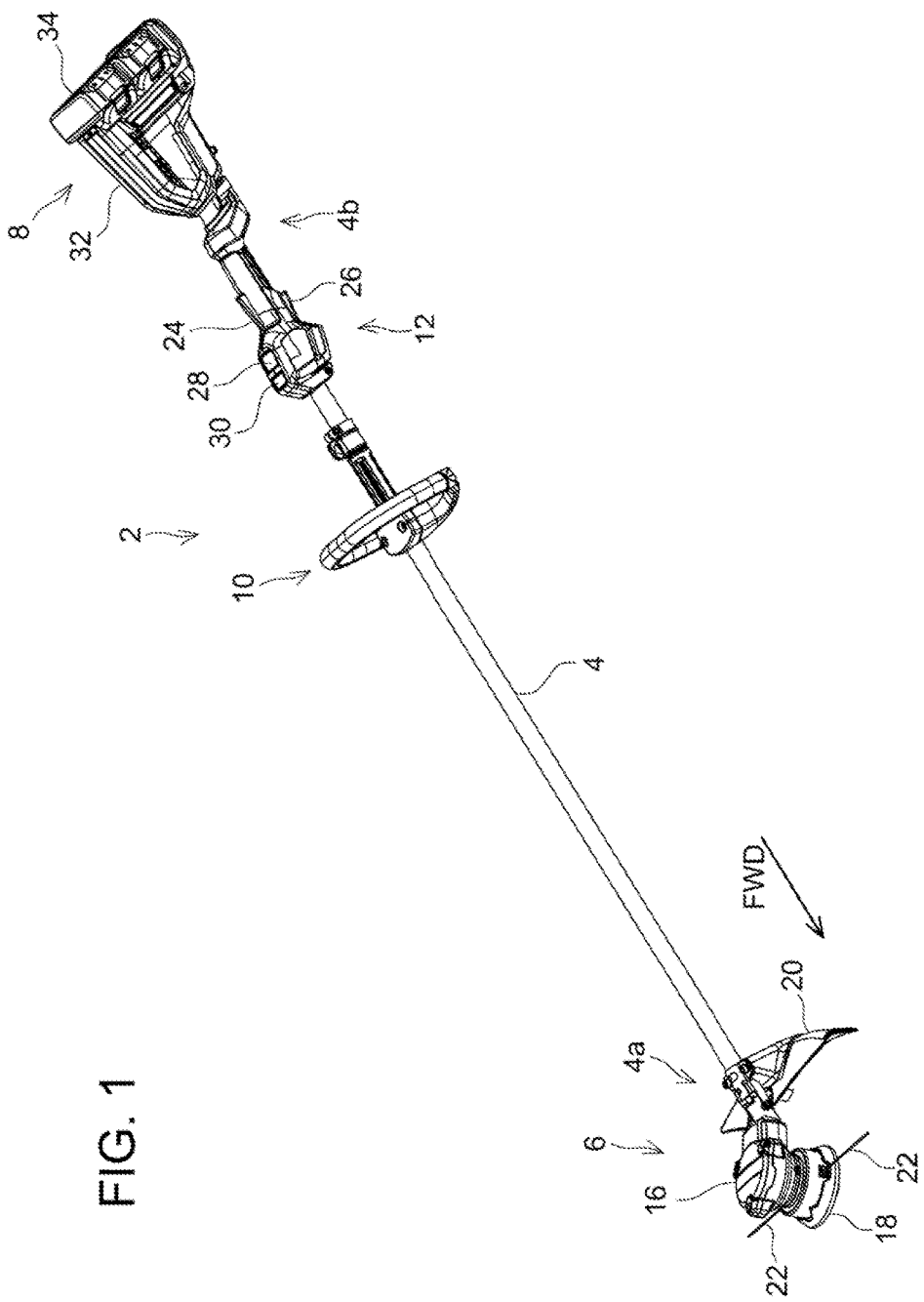
FIG. 1 is a perspective view showing a bush cutter 2 in an embodiment.

In some embodiments, the stator further includes an insulator covering at least a part of the stator core, and the insulator has a flat portion formed along the radial direction and a circumferential direction of the stator core. In this case, when the first coil, the second coil, or the third coil is to be wound across a plurality of tooth portions, the flat portion can be used as a space for passing a wire of the first coil, the second coil, or the third coil from one tooth portion to another tooth portion. Thus, the winding work of the first coil, the second coil, and the third coil can be more easily performed.

In some embodiments, the insulator has a rib formed near a base of each tooth portion and protruding from the flat portion. In this case, the ribs of the insulator can be used as guides for passing a wire of the first coil, the second coil, or the third coil from one tooth portion to another tooth portion. Further, the ribs formed on the insulator prevent a wire of the first coil, the second coil, or the third coil passing through the flat portion from expanding and protruding outward. Therefore, the first coil, the second coil, or the third coil whose wire has been passed through the flat portion does not hamper the subsequent winding work.

In some embodiments the insulator has a cylindrical wall protruding from the flat portion. In this case, the cylindrical wall of the insulator can be used as guides for passing a wire of the first coil, the second coil, or the third coil from one tooth portion to another tooth portion.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved electric working machines, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

Hereinafter, a bush cutter 2 according to an embodiment of an electric working machine will be described with reference to the drawings. The bush cutter 2 shown in FIG. 1 is a horticultural electric working machine and is used for cutting a plant. The bush cutter 2 includes: a support pole 4; a front end unit 6 provided at a front end 4a of the support pole 4; a rear end unit 8 provided at a rear end 411 of the support pole 4; a loop handle 10 provided at a middle of the support pole 4; and a grip 12 provided between the loop handle 10 and the rear end unit 8 of the support pole 4. The support pole 4 has a hollow pipe shape and linearly extends from the front end 4a to the rear end 4b.

Figure 2:
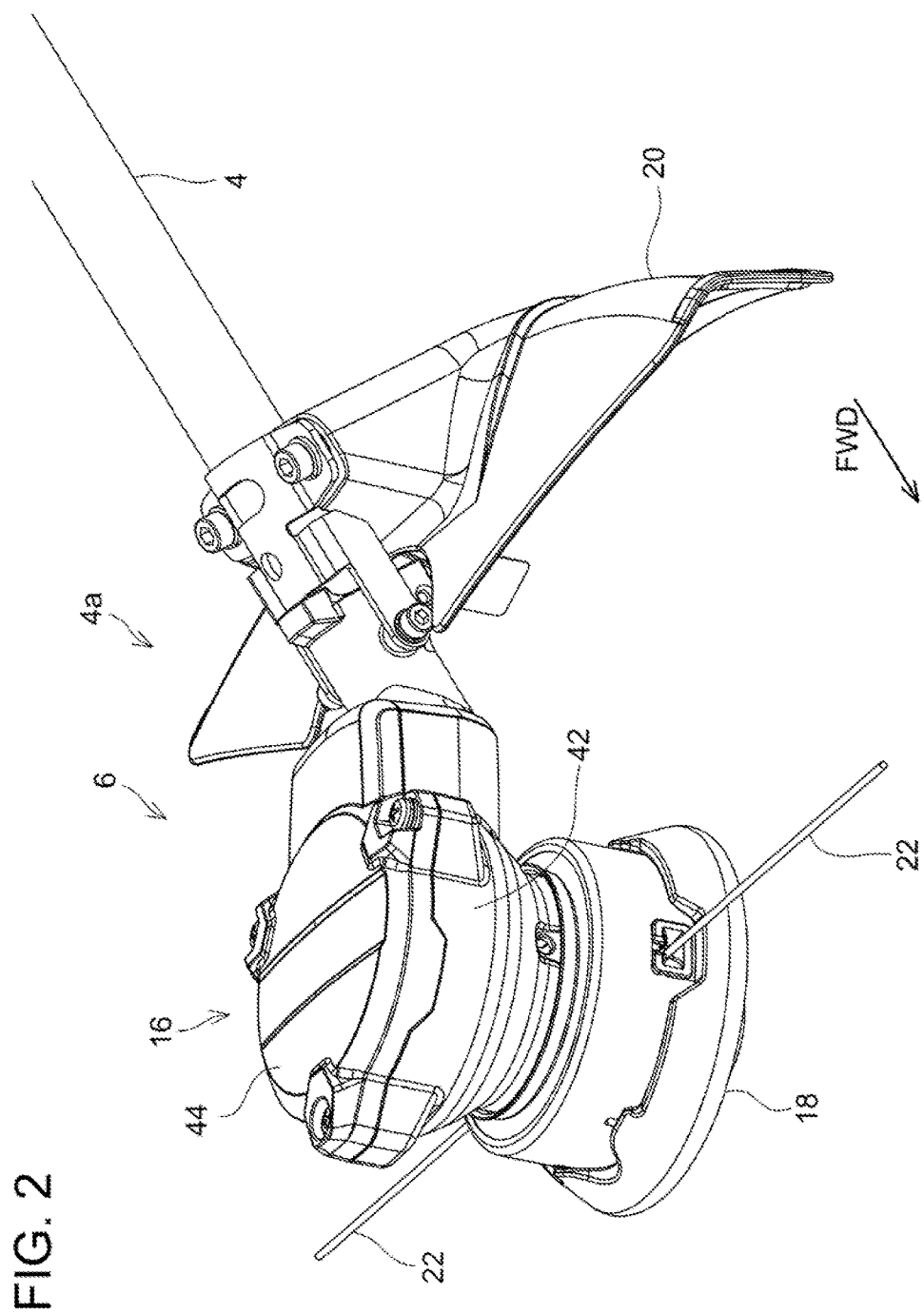
FIG. 2 is a perspective view showing a front end unit 6 of the bush cutter 2 in the embodiment.

As shown in FIG. 2, the front end unit 6 includes: a motor housing 16 which contains a motor 14 (see FIG. 3); a cord holder 18 detachably attached under the motor housing 16; and a safety cover 20 attached to the support pole 4, at a rear side relative to the motor housing 16 and the cord holder 18. The motor 14 is a brushless three-phase motor of outer rotor type. The cord holder 18 is rotationally driven by the motor 14. The cord holder 18 holds a string-like cutter cord 22. Ends of the cutter cord 22 are drawn out from the cord holder 18, and rotated with the cord holder 18. The bush cutter 2 of the present embodiment cuts a plant by the cutter cord 22 rotating at a high speed. The cutter cord 22 in the present embodiment is, for example, a nylon cord.

The loop handle 10 shown in FIG. 1 has a hollow pipe shape, and is formed in a loop shape expanding upward and laterally with respect to the support pole 4. The loop handle 10 is fixed to the support pole 4.

The grip 12 is formed so as to cover outer circumference of the support pole 4. The grip 12 has a lock-off lever 24 provided on an upper surface thereof, and a trigger switch 26 provided on a lower surface thereof. The trigger switch 26 is a switch for driving the motor 14 of the front end unit 6. When the trigger switch 26 is not pushed, supply of power to the motor 14 is interrupted. When the trigger switch 26 is pushed, power is supplied to the motor 14. The lock-off lever 24 is a lever for restricting a pushing operation of the trigger switch 26 and cancelling the restriction. When the lock-off lever 24 is not pushed, a pushing operation of the trigger switch 26 is restricted. When the lock-off lever 24 is pushed, the restriction of a pushing operation of the trigger switch 26 is cancelled.

On an upper surface of the grip 12, an operation panel 28 and a display panel 30 are provided at a front side relative to the lock-off lever 24. The operation panel 28 contains an operation board (not shown). On the operation board, an operation button 28a (see FIG. 10) for controlling driving of the motor 14 of the front end unit 6 is provided. A worker can perform operation such as switching between driving and stop of the motor 14, switching the rotation direction of the motor 14, and chancing the rotation speed of the motor 14, by operating the operation button 28a. The display panel 30 contains a display board (not shown). On the display board, a display lamp 30a (see FIG. 10) is attached which displays an operation state of the motor 14.

A worker who uses the bush cutter 2 grasps the loop handle 10 with one hand, and grasps the grip 12 with the other hand. Then, the worker performs a pushing operation of the lock-off lever 24 with the base of the thumb of the hand grasping the grip 12, and performs a pushing operation of the trigger switch 26 with the index finger, the middle finger, the ring finger, and/or the little finger of the same hand. Thus, power is supplied to the motor 14. In this state, the worker operates the operation button 28a of the operation panel 28 with the thumb of the hand grasping the grip 12, thereby controlling operation of the motor 14.

Figure 3:
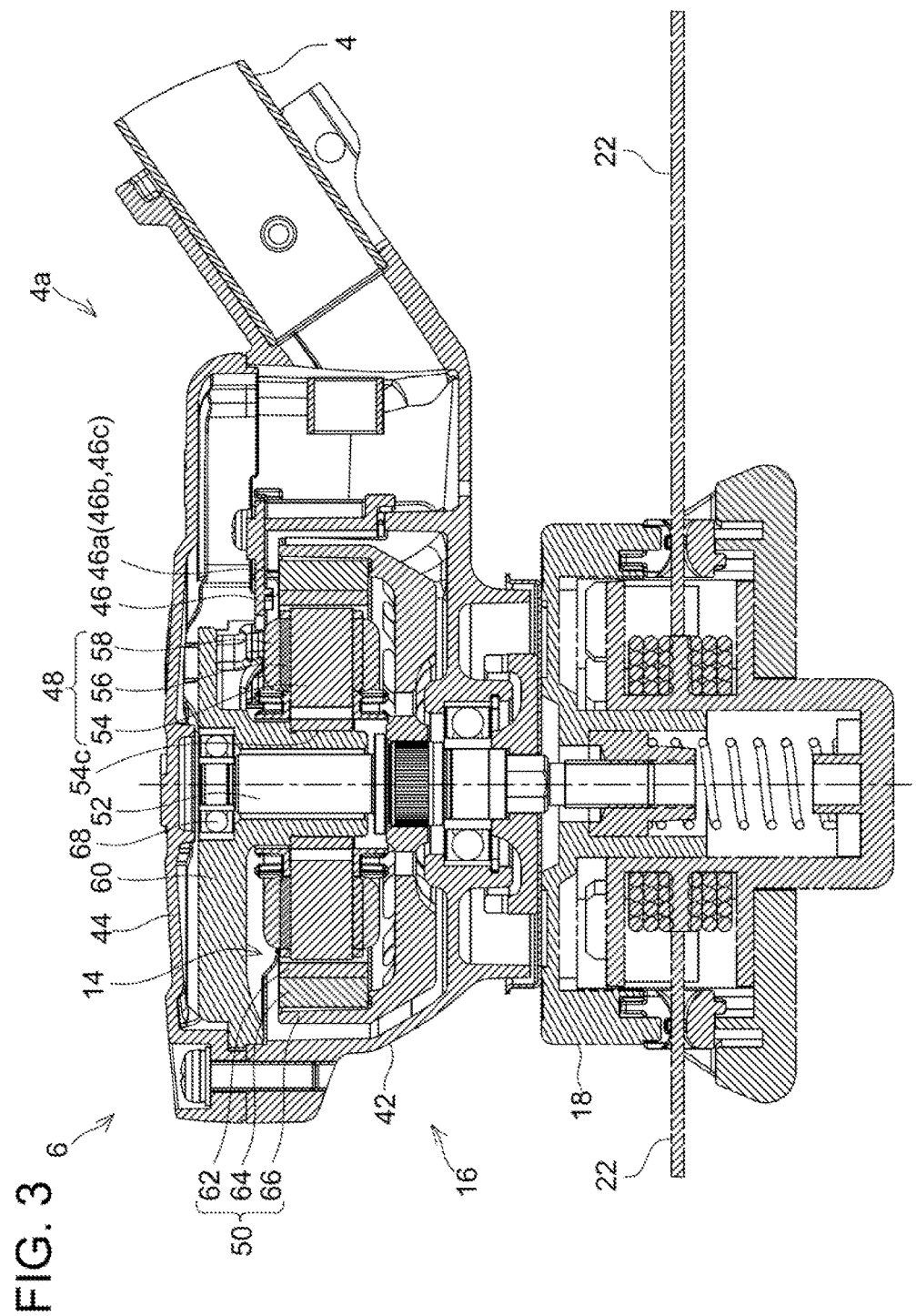
FIG. 3 is a vertical sectional view of the front end unit 6 of the bush cutter 2 in the embodiment.

As shown in FIG. 3, the motor housing 16 of the front end unit 6 includes a housing body 42 which opens at its upper part, and an upper surface cover 44 which covers the opening at the upper part of the housing body 42. The housing body 42 contains the motor 14 and the sensor board 46. The motor 14 includes a stator 48, a rotor 50, and a motor shaft 52. In the following description, an axis direction means a direction along the motor shaft 52.

Figure 4:
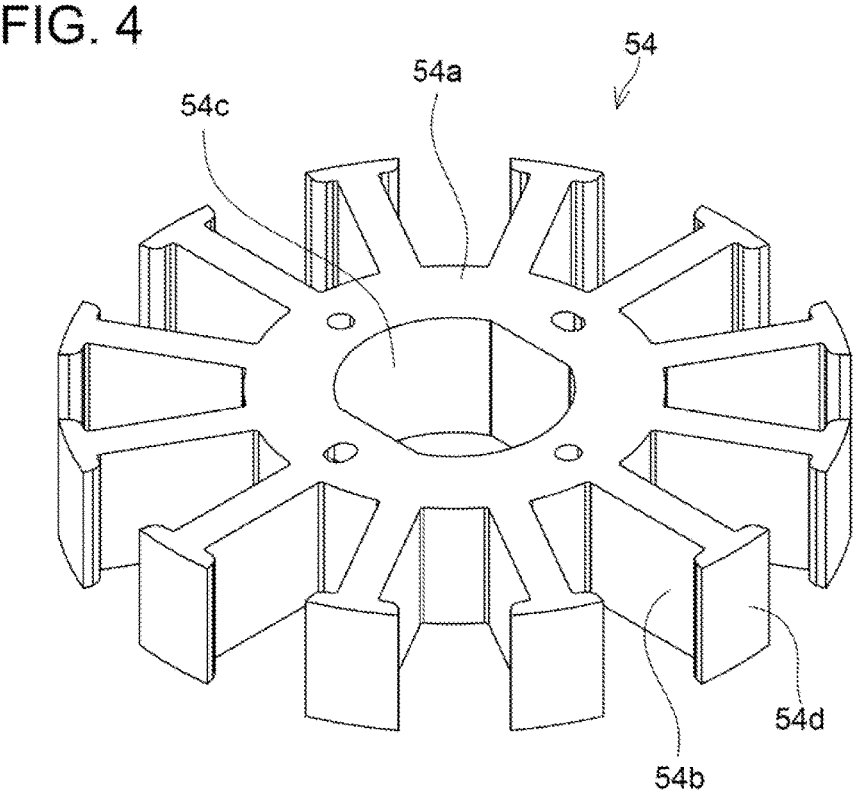
FIG. 4 is a perspective view showing a stator core 54 of the bush cutter 2 in the embodiment.

The stator 48 includes a stator core 54, an insulator 56, and a coil 58. The stator core 54 is made of magnetic material. As shown in FIG. 4, the stator core 54 has a cylindrical base portion 54a at the center thereof, and a plurality of tooth portions 54b radially extending along the radial direction from the cylindrical base portion 54a. In the present embodiment, the stator core 54 has twelve tooth portions 54b. At the center of the base portion 54a, a fitting hole 54c into which a stator base 60 (see FIG. 3) is fitted is formed. As shown in FIG. 3, the stator base 60 is fitted into the fitting hole 54e of the stator core 54, and the stator base 60 is fixed to the housing body 42, whereby the stator 48 is fixed to the housing body 42. As shown in FIG. 4, the fitting hole 54c is formed in a track shape with both ends of two parallel straight lines connected by arcs, and the stator base 60 is also formed in the corresponding shape. Thus, the stator core 54 can be prevented from rotating relative to the stator base 60 when the stator base 60 is fitted into the fitting hole 54c.

Figure 5:
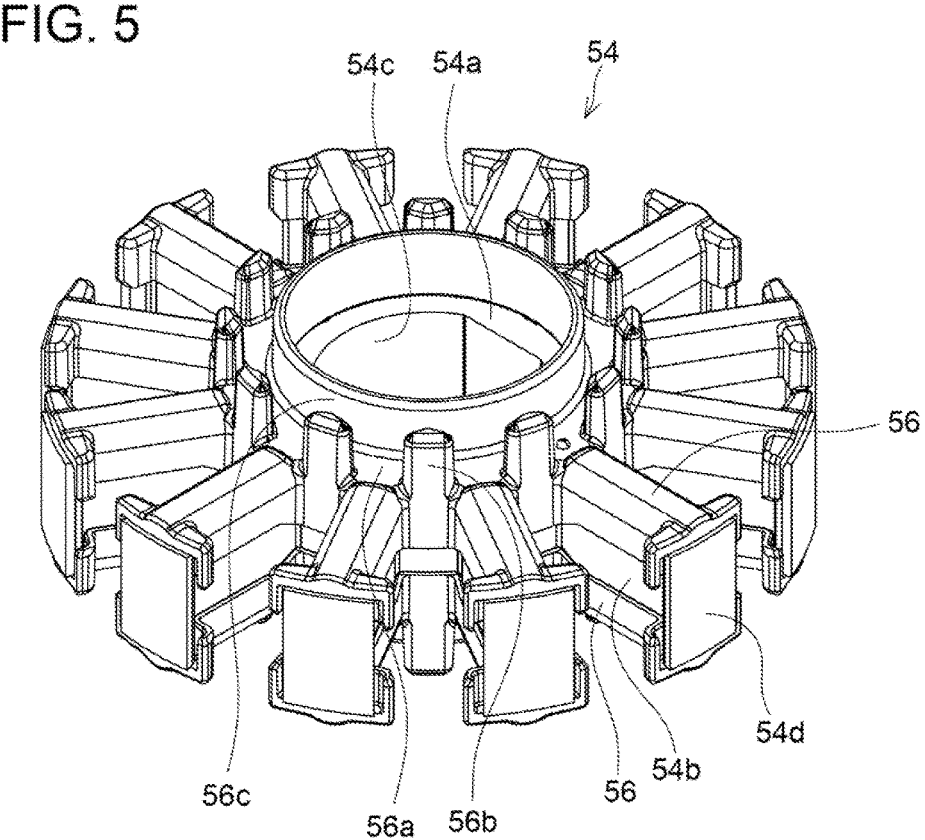
FIG. 5 is a perspective view showing the stator core 54 and an insulator 56 of the bush cutter 2 in the embodiment.

The insulator 56 is made of resin material, and electrically insulates the stator core 54 and the coil 58 from each other. As shown in FIG. 5, the insulator 56 is formed so as to cover an upper surface side and a lower surface side of the base portion 54a and the tooth portions 54b of the stator core 54. In a state in which the insulator 56 is attached, an end surface 54d of each tooth portion 54b is exposed. The insulator 56 has a flat portion 56a covering the base portion 54a of the stator core 54; ribs 56b formed between the adjacent tooth portions 54b, near bases of the tooth portions 54b; and a cylindrical wall 56c formed at the center side on the flat portion 56a so as to surround the fitting hole 54c of the stator core 54. The flat portion 56a is formed along the radial direction and the circumferential direction of the stator core 54. The ribs 56b and the cylindrical wall 56c are formed so as to protrude in the axis direction from the flat portion 56a.

Figure 6:
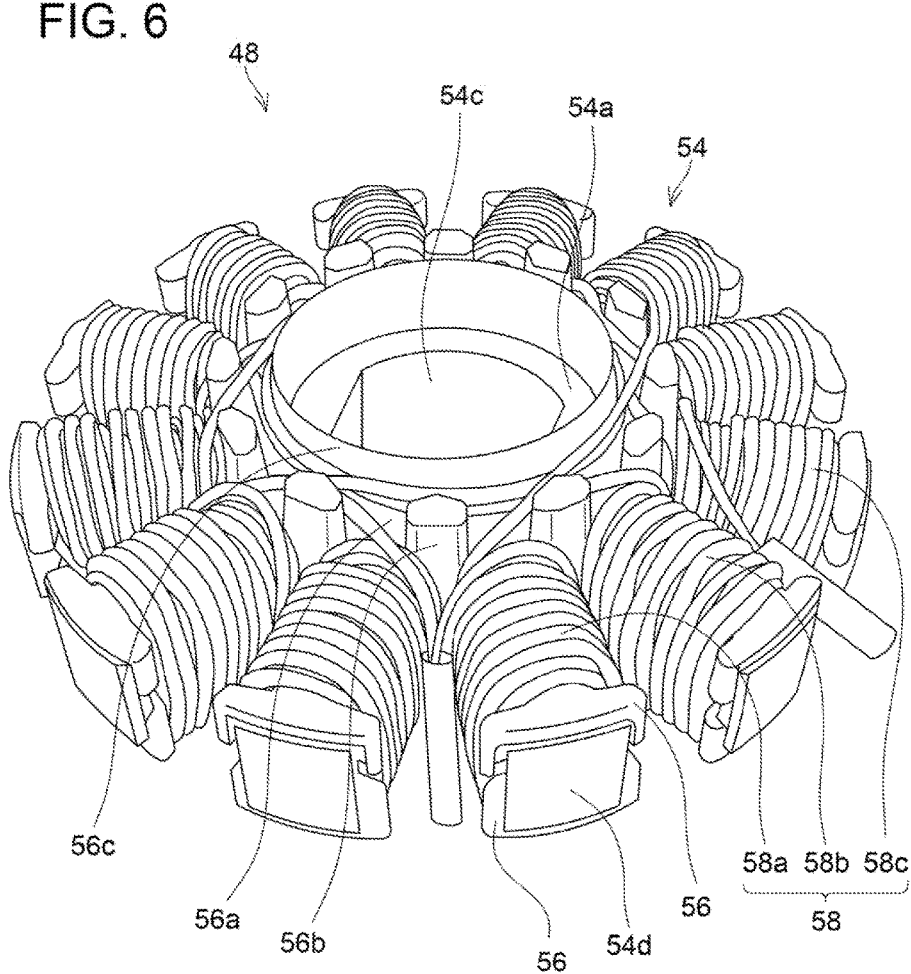
FIG. 6 is a perspective view showing a stator 48 of the bush cutter 2 in the embodiment.

As shown in FIG. 6, the coil 38 is wound around the circumferential side surface of each tooth portion 54b of the stator core 54 from outside of the insulator 56. The coil 58 includes a U-phase coil 58a, a V-phase coil 58b, and a W-phase coil 58c, to which U-phase voltage, V-phase voltage, and W-phase voltage are applied, respectively. When current is applied to the coil 58, the tooth portions 54b of the stator core 54 are excited, and the end surfaces 54d of the tooth portions 54b operate as magnetic poles.

Each of the U-phase coil 58a, the V-phase coil 58b, and the W-phase coil 58c is wound across a plurality of the tooth portions 54b. When the U-phase coil 58a, the V-phase coil 58b, or the W-phase coil 58c wound on one tooth portion 54b is to be wound to another tooth portion 54b, a wire of the U-phase coil 58a, the V-phase coil 58b, or the NV-phase coil 58c is passed through an area surrounded by the flat portion 56a, the ribs 56b, and the cylindrical wall 56c of the insulator 56. In the present embodiment, since the insulator 56 has the flat portion 56a, a sufficient space is secured for passing a wire of the U-phase coil 58a, the V-phase coil 58b, or the W-phase coil 58c from one tooth portion 54b to another tooth portion 54b, whereby winding work can be easily performed. In addition, the ribs 56b and the cylindrical wall 55c of the insulator 56 can be used as guides for passing a wire of the U-phase coil 58a, the V-phase coil 58b, or the W-phase coil 58c from one tooth portion 54b to another tooth portion 54b. Further, since the ribs 56b are formed on the insulator 56, a wire of the U-phase coil 58a, the V-phase coil 58b, or the W-phase coil 58c passing through an area surrounded by the flat portion 56a, the ribs 56b, and the cylindrical wall 56e is prevented from expanding and protruding outward. Therefore, the U-phase coil 58a, the V-phase coil 58b, or the W-phase coil 58c whose wire has been passed through an area surrounded by the flat portion 56a, the ribs 56b, and the cylindrical wall 56c does not hamper the subsequent winding work.

Figure 7:
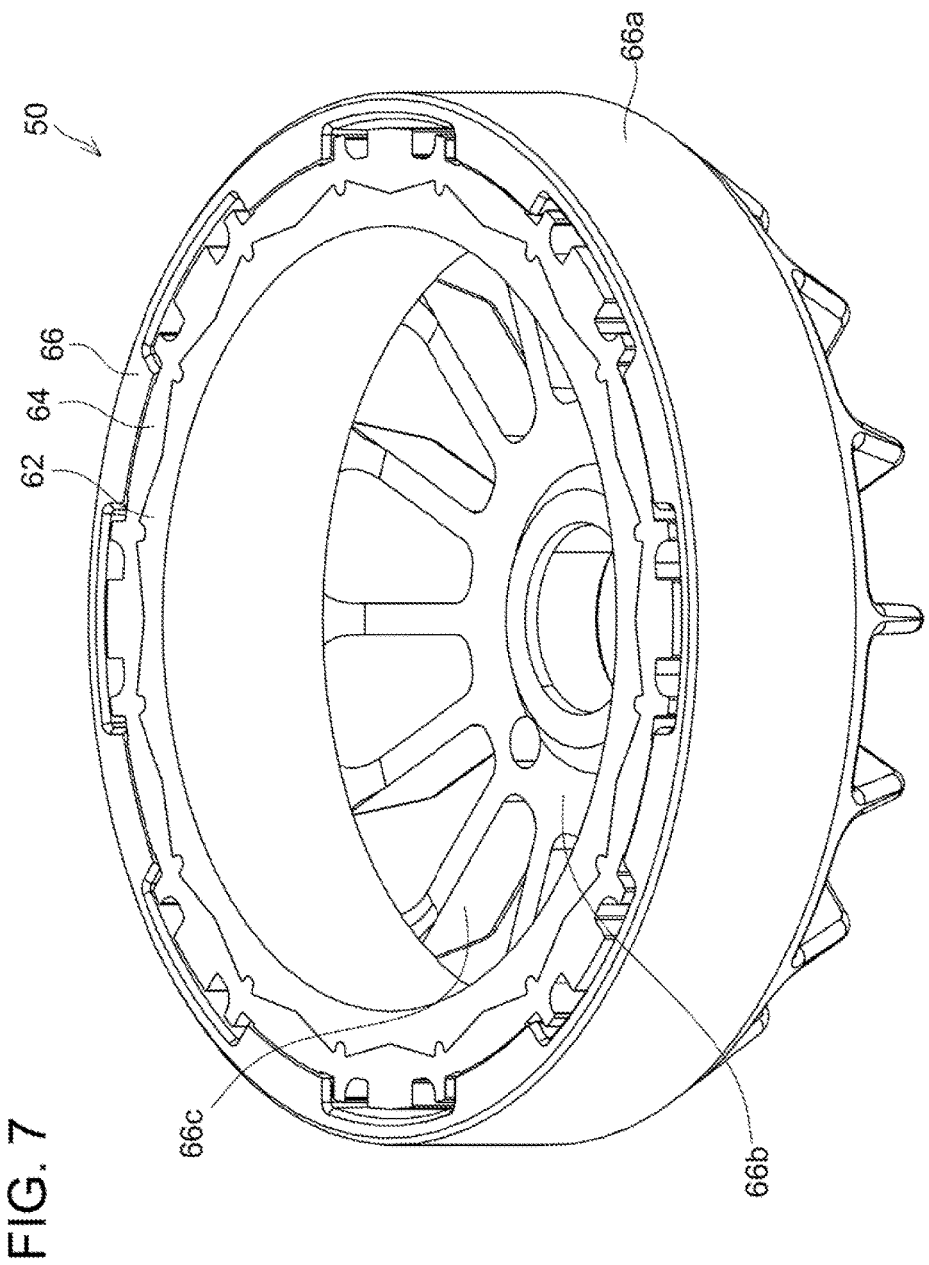
FIG. 7 is a perspective view showing a rotor 50 of the bush cutter 2 in the embodiment.

As shown in FIG. 7, the rotor 50 includes: a magnet 62 having an inner circumferential surface formed in a cylindrical shape; a rotor core 64 integrally attached on an outer circumferential surface of the magnet 62; and a fan 66 fixed to the rotor core 64. The magnet 62 is made of rare earth anisotropic bond magnet. The rotor core 64 is formed by stacking a plurality of electromagnetic steel sheets. The fan 66 is made of metal material.

Figure 8:
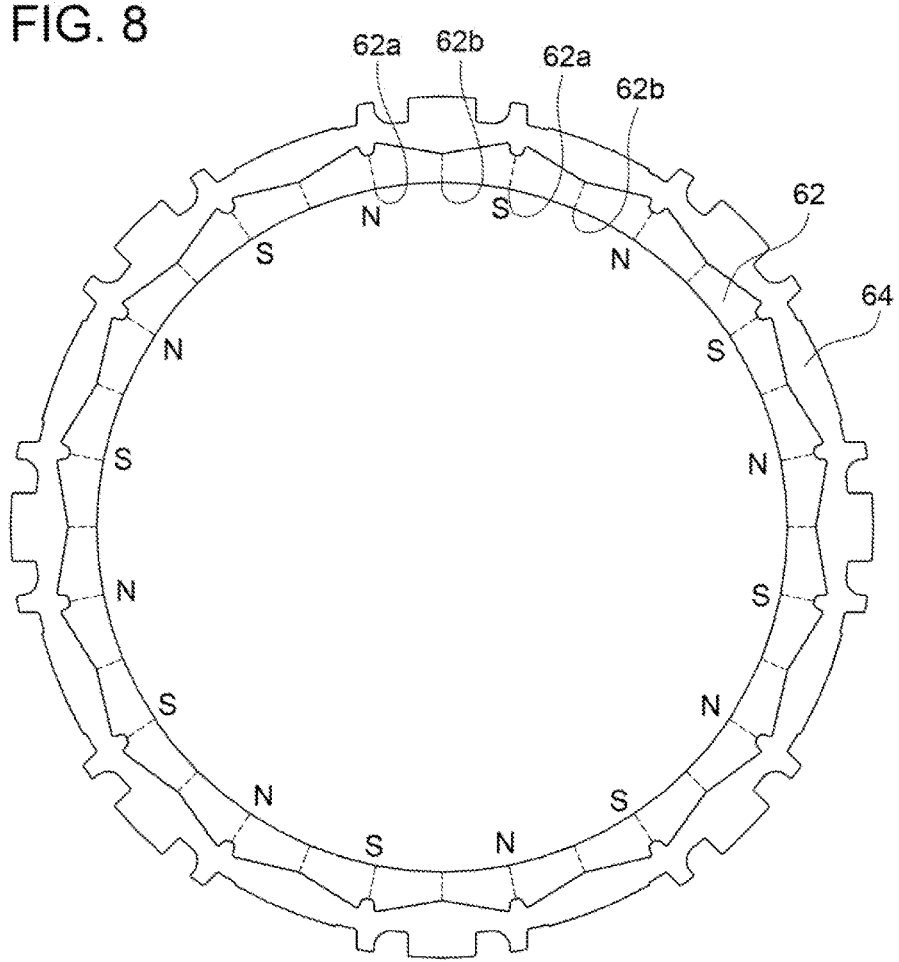
FIG. 8 is a plan view showing a magnet 62 and a rotor core 64 of the bush cutter 2 in the embodiment.

As shown in FIG. 8, the magnet 62 is magnetized such that two kinds of magnetic poles of N pole and S pole are alternately formed on the inner circumferential surface thereof. The magnet 62 is formed such that the width in the radial direction is great in the vicinity of a position 62a which is the center of each magnetic pole, and the width in the radial direction is small in the vicinity of a position 62b at which the magnetic pole is switched. In other words, in the vicinity of the position 62a at the center of each magnetic pole, the width in the radial direction of the magnet 62 is greater than the average width in the radial direction of the magnet 62, and in the vicinity of the position 62b at which the magnetic pole is switched, the width in the radial direction of the magnet 62 is smaller than the average width in the radial direction of the magnet 62.

Figure 9:
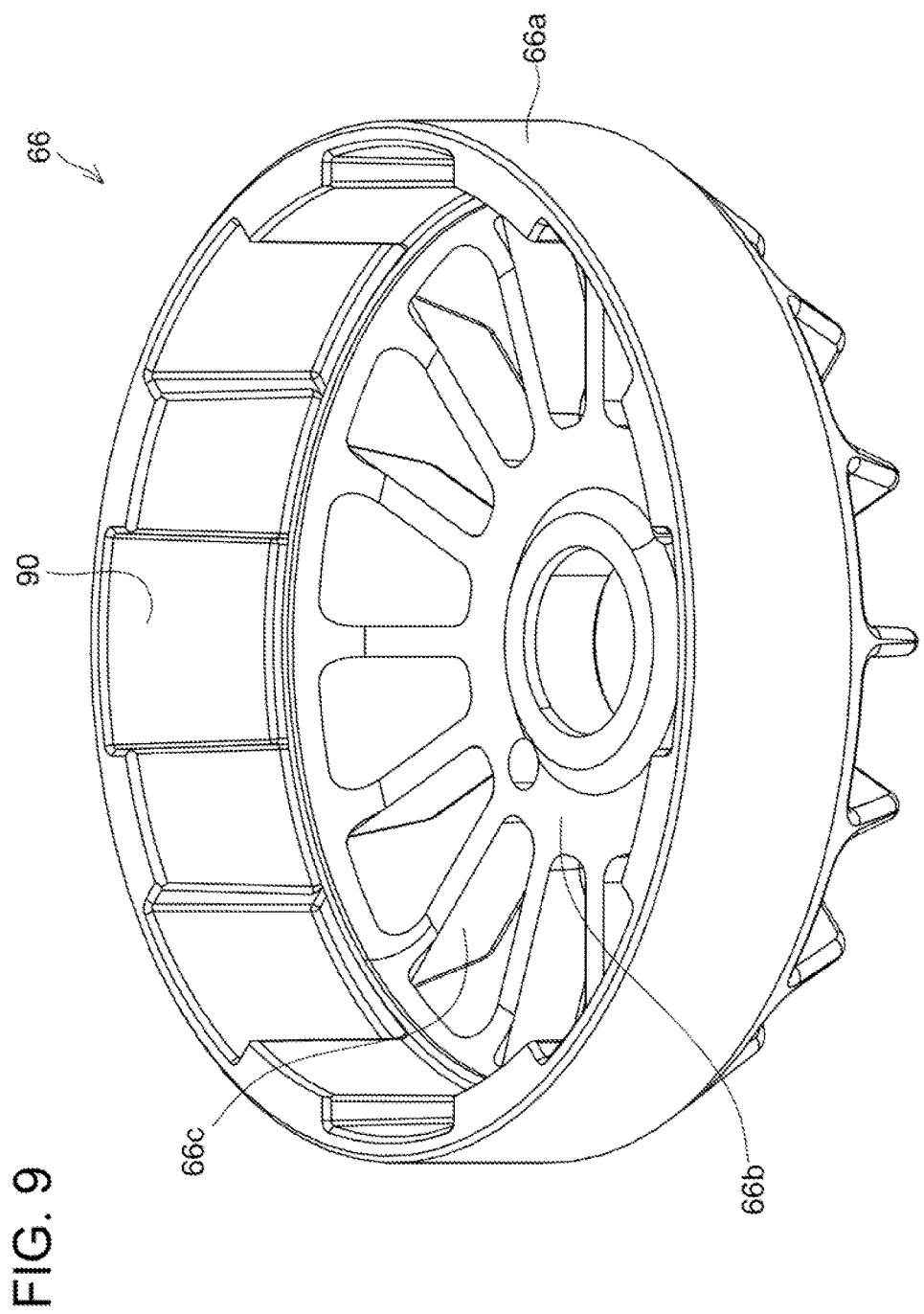
FIG. 9 is a perspective view showing a fan 66 of the bush cutter 2 in the embodiment.

As shown in FIG. 9, the fan 66 has: a cylindrical storage portion 66a which stores the magnet 62 and the rotor core 64; a connection portion 66b connected with the motor shaft 52; and a plurality of plate-like blade portions 66c radially extending between the storage portion 66a and the connection portion 66b. By driving of the motor 14, the fan 66 is rotated integrally with the magnet 62 and the rotor core 64, whereby air is sent to the stator 48 by the blade portions 66c.

As shown in FIG. 3, an upper end of the motor shaft 52 is supported by the stator base 60 via a hearing 68, and a lower end thereof is connected to the cord holder 18. Rotation of the motor 14 is transmitted to the cord holder 18 via the motor shaft 52.

On the sensor board 46, a plurality of magnetic sensors 46a, 46b, and 46c are attached for detecting variation in a magnetic field due to rotation of the rotor 50. The magnetic sensors 46a, 46b, and 46e in the present embodiment are, for example, Hall elements. The sensor board 46 is fixed, to the housing body 42, at such a position that the magnetic sensors 46a, 46b, and 46c are opposed to the magnet 62 of the rotor 50.

As shown in FIG. 1, the rear end unit 8 includes a rear end housing 32 containing a control board (not shown), and a battery pack 34 detachably attached to the rear end housing 32. The battery pack 34 has a plurality of rechargeable battery cells. The battery pack 34 has, for example, ten lithium ion battery cells connected in series, and has a nominal voltage of 36 volts.

Figure 10:
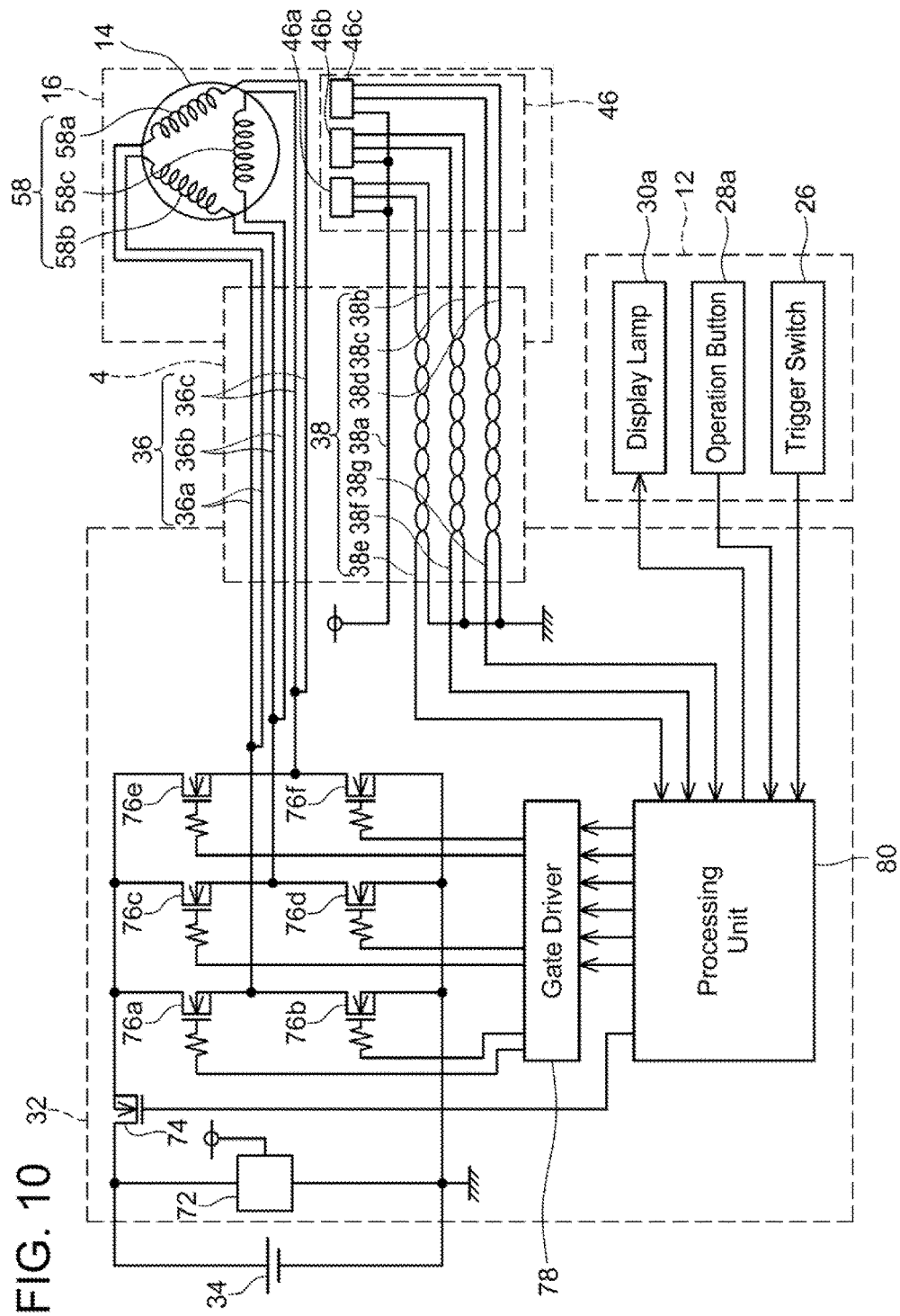
FIG. 10 is a circuit diagram showing an electrical system of the bush cutter 2 in the embodiment.

As shown in FIG. 10, the control board includes a constant voltage circuit 72, an interruption circuit 74, switching elements 76a, 76b, 76c, 76d, 76e, and 76f, a gate driver 78, and a processing unit 80. The constant voltage circuit 72 is electrically connected to the battery pack 34. The constant voltage circuit 72 generates power supply voltage for the control board. The interruption circuit 74 is provided on a circuit electrically connecting the battery pack 34 and the switching elements 76a, 76b, 76e, 76d, 76c, and 76f, and is capable of switching a conductive state/nonconductive state between the battery pack 34 and the switching elements 76a, 76b, 76c, 76d, 76e, and 76f. The interruption circuit 74 in the present embodiment is, for example, a metal oxide semiconductor field effect transistor (MOSFET). The interruption circuit 74 may be an insulated gate bipolar transistor (IGBT) or another switching element. The interruption circuit 74 is connected to the processing unit 80, and controlled to be switched between a conductive state and a nonconductive state by the processing unit 80.

The switching elements 76a, 76b, 76c, 76d, 76e, and 76f in the present embodiment are, for example, metal oxide semiconductor field effect transistors (MOSFET). The switching elements 76a, 76b, 76c, 76d, 76e, and 76f may be insulated gate bipolar transistors (IGBT) or other switching elements. The switching elements 76a, 76b, 76c, 76d, 76e, and 76f are connected to the coil 58 of the motor 14 via a motor power line 36. The motor power line 36 includes a UV line 36a, a VW line 36b, and a WU line 36c. The UV line 36a is connected to a start end of the U-phase coil 58a and a finish end of the V-phase coil 58b. The UV line 36b is connected to a start end of the V-phase coil 58b and a finish end of the W-phase coil 58c. The WU line 36c is connected to a start end of the W-phase coil 58c and a finish end of the U-phase coil 58a. The switching elements 76a and 76b switch voltage of the UV line 36a between positive voltage and negative voltage of the battery pack 34. The switching elements 76c and 76d switch voltage of the VW line 36b between positive voltage and negative voltage of the battery pack 34. The switching elements 76e and 76l switch voltage of the WU line 36c between positive voltage and negative voltage of the battery pack 34. The gate driver 78 controls switching of the switching elements 76a, 76b, 76e, 76d, 76e, and 76f.

Based on input signals from the trigger switch 26 and the operation button 28a and input signals from the magnetic sensors 46a, 46b, and 46c, the processing unit 80 controls operation of the motor 14 and controls operation of the display lamp 30a of the display panel 30. Specifically, the processing unit 80 detects the rotational position of the rotor 50 of the motor 14 based on input signals from the magnetic sensors 46a, 46b, and 46c, and controls switching tunings of the switching elements 76a, 76b, 76c, 76d, 76e, and 76f in accordance with the rotational position of the rotor 50.

The control board and the sensor board 46 are connected to each other by a sensor signal line 38. The sensor signal line 38 includes: a supply voltage line 38a for supplying power supply voltage from the control board to the magnetic sensors 46a, 46b, and 46c; earth voltage lines 38b, 38c, and 38d for supplying earth voltage from the control board to the magnetic sensors 46a, 46b, and 46c; and detection signal lines 38e, 38f, and 38g for supplying detection signals from the magnetic sensors 46a, 46b, and 46c to the processing unit 80.

The motor power line 36 passes through the inside of the support pole 4, to connect the control board in the rear end housing 32 and the motor 14 in the motor housing 16. Similarly, the sensor signal line 38 passes through the inside of the support pole 4, to connect the control board in the rear end housing 32 and the sensor board 46 in the motor housing 16.

Figure 11:
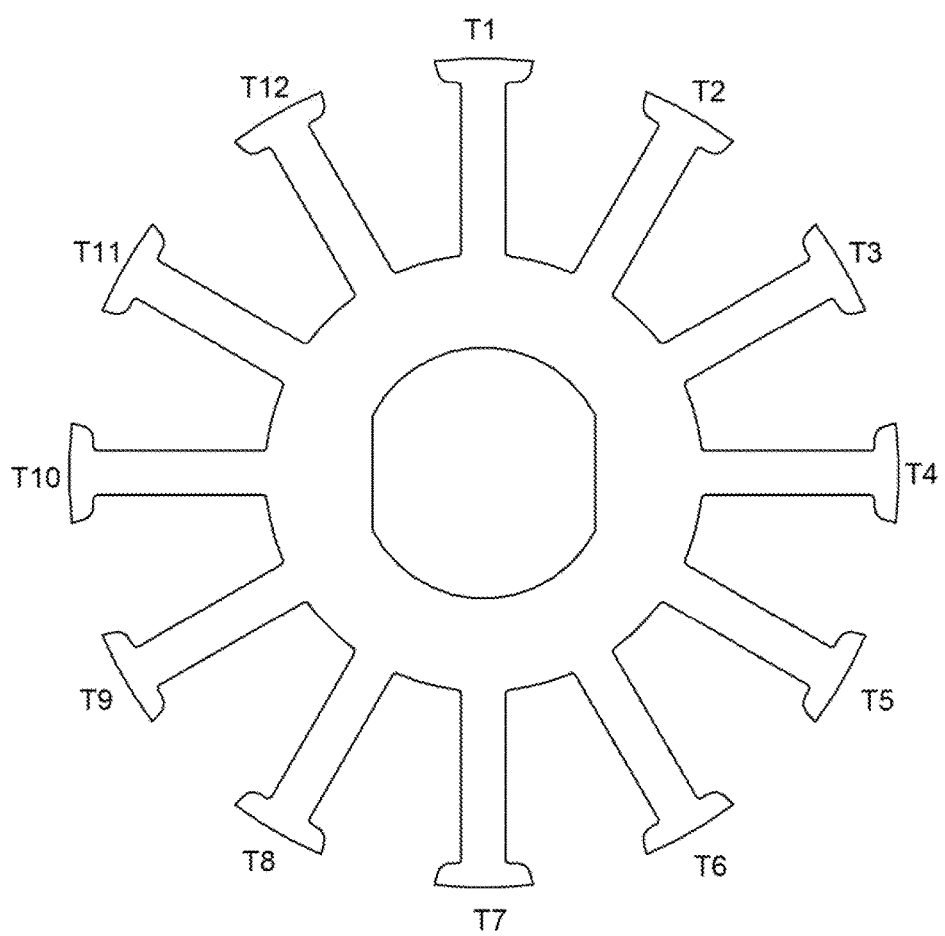
FIG. 11 is a plan view showing arrangement of tooth portions 54b of the bush cutter 2 in the embodiment.

Hereinafter, a method for winding the coil 58 on the stator 48 will be described. In the following description, as shown in FIG. 11, the twelve tooth portions 54b are referred to as T1, T2, . . . , and T12, respectively. In the present embodiment, the U-phase coil 58a the V-phase coil 58b, and the W-phase coil 58c are wound as shown in FIG. 12.

In the winding method shown in FIG. 12, the U-phase coil 58a is wound in order of T5, T8, T11, and then T12, the start end thereof is led out to the UV line 36a, and the finish end thereof is led out to the WU line 36c. The V-phase coil 58b is wound in order of T3, T12, T9, and then T6, the start end thereof is led out to the VW line 36b, and the finish end thereof is led out to the UV line 36a. The W-phase coil 58c is wound in order of T1, T10, T7, and then T4, the start end thereof is led out to the WU line 36c, and the finish end thereof is led out to the VW line 36b.

In the winding method shown in FIG. 12, the UV line 36a is led out from a slot between T5 and T6, the VW line, 36b is led out from a slot between T3 and T4, and the WU line 36c is led out from a slot between T1 and T2. That is, the UV line 36a, the VW line 36b, and the WU line 36c are all led out from a range between T1 and T6. In this case, an angle between the adjacent tooth portions 54b is 360 degrees/12=30 degrees, and therefore the UV line 36a, the VW line 36b, and the WU line 36c can be led out from a range of 150 degrees. Owing to the configuration as described above, it becomes possible to reduce a space needed for arranging the UV line 36a, the VW line 36b, and the WU line 36c inside the motor housing 16.

The U-phase coil 58a, the V-phase coil 58b, and the W-phase coil 58c may be wound as shown in FIG. 13. In the winding method shown in FIG. 13, the U-phase coil 58a is wound in order of T5, T11, T8, and then T2, the start end thereof is led out to the UV line 36a, and the finish end thereof is led out to the WU line 36c. The V-phase coil 58b is wound in order of T3, T12, T9, and then T6, the start end thereof is led out to the VW line 36b, and the finish end thereof is led out to the UV line 36a. The W-phase coil 58c is wound in order of T1, T10, T7, and then T4, the start end thereof is led out to the WU line 36c, and the finish end thereof is led out to the VW line 36b.

Also in the winding method shown in FIG. 13, the UV line 36a is led out from a slot between T5 and T6, the VW line 36b is led out from a slot between T3 and T4, and the WU line 36c is led out from a slot between T1 and T2. Therefore, also in this case, the UV line 36a, the VW line 36b, and the WU line 36c can be led out from a range of 150 degrees. Owing to the configuration as described above, it becomes possible to reduce a space needed for arranging the UV line 36a, the VW line 36b, and the WU line 36c inside the motor housing 16.

Alternatively, the U-phase coil 58a, the V-phase coil 58b, and the W-phase coil 58c may be wound as shown in FIG. 14. In the winding method shown in FIG. 14, the U-phase coil 58a is wound in order of T5, T8, T11, and then 12, the start end thereof is led out to the UV line 36a, and the finish end thereof is led out to the WU line 36c. The V-phase coil 58b is wound in order of T3, T12, T9, and then T6, the start end thereof is led out to the VW line 36b, and the finish end thereof is led out to the UV line 36a. The W-phase coil 58c is wound in order of T1, T7, T10, and then T4, the start end thereof is led out to the WU line 36c, and the finish end thereof is led out to the VW line 36b.

Also in the winding method shown in FIG. 14, the UV line 36a is led out from a slot between T5 and T6, the VW line 36b is led out from a slot between T3 and T4, and the WU line 36c is led out from a slot between T1 and T2. Therefore, also in this case, the UV line 36a, the VW line 36b, and the WU line 36c can be led out from a range of 150 degrees. Owing to the configuration as described above, it becomes possible to reduce a space needed for arranging the UV line 36a, the VW line 36b, and the WU line 36c inside the motor housing 16.

While specific embodiments of the present invention have been described in detail, these embodiments are for illustrative purposes only and are not intended to limit the scope of the claims. The techniques described in the claims include various modifications and changes made to the specific embodiments illustrated above.

For example, in the above embodiment, each rib 56b of the insulator 56 is formed between the adjacent tooth portions 54b, but instead of this structure, the ribs 56b of the insulator 56 may be formed at bases of the tooth portions 54b.

In the above embodiment, the stator core 54 has twelve tooth portions 54b, but the number of tooth portions 54b is not limited thereto. In the case of using a three-phase brushless motor as the motor 14, any number of the tooth portions 54b may be provided as long as the number is a multiple of three.

Figures 15, 16:
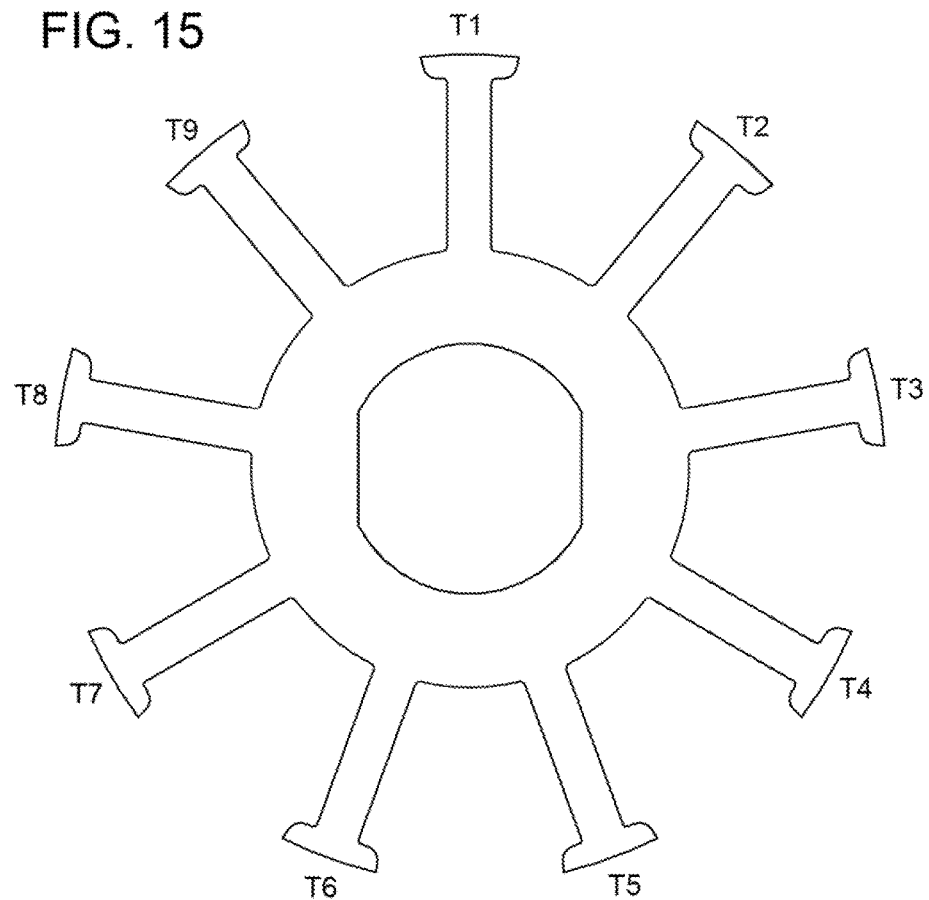
FIG. 15 is a plan view showing arrangement of tooth portions 54b of a bush cutter 2 in a modification.
FIG. 16 is a table showing a winding method for a coil 58 of the bush cutter 2 in the modification.

For example, as shown in FIG. 15, the stator core 54 may have nine tooth portions 54b. In this case, the U-phase coil 58a, the V-phase coil 58b, and the W-phase coil 58c are wound as shown in FIG. 16. In the winding method shown in FIG. 16, the U-phase coil 58a is wound in order of T5, T8, and then T2, the start end thereof is led out to the UV line 36a, and the finish end thereof is led out to the WU line 36c. The V-phase coil 58b is wound in order of T3, T9, and then T6, the start end thereof is led out to the VW line 36b, and the finish end thereof is led out to the UV line 36a. The W-phase coil 58c is wound in order of T1, T7, and then T4, the start end thereof is led out to the WU line 36c, and the finish end thereof is led out to the VW line 36b. In the winding method shown in FIG. 16, the UV line 36a is led out from a slot between T5 and T6, the VW line 36b is led out from a slot between T3 and T4, and the WV line 36c is led out from a slot between T1 and T2. In this case, an angle between the adjacent tooth portions 54b is 360 degrees/9=40 degrees, and therefore the UV line 36a, the VW line 36b, and the WU line 36c can be led out from a range of 200 degrees. Owing to the configuration as described above, it becomes possible to reduce a space needed for arranging the UV line 36a, the VW line 36b, and the WU line 36c inside the motor housing 16.

Figures 17, 18:
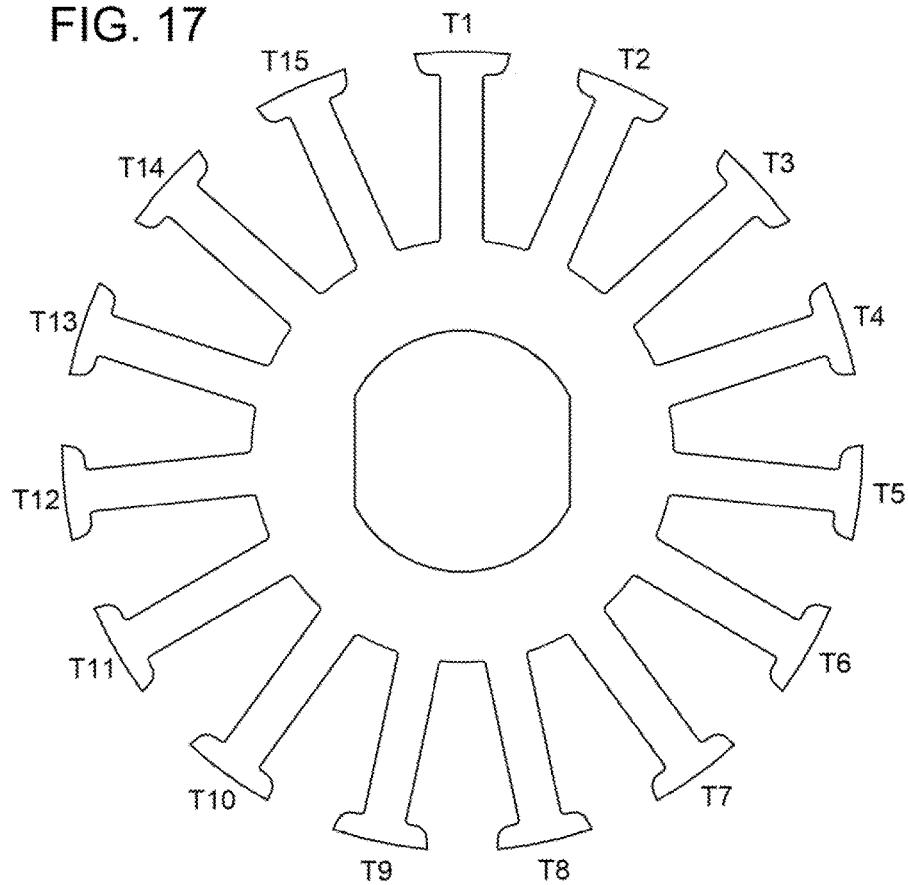
FIG. 17 is a plan view showing arrangement of tooth portions 54b of a bush cutter 2 in a modification.
FIG. 18 is a table showing a winding method for a coil 58 of the bush cutter 2 in the modification.

Alternatively, as shown in FIG. 17, the stator core 54 may have fifteen tooth portions 54b. In this case, the U-phase coil 58a, the V-phase coil 58b, and the W-phase coil 58c are wound as shown in FIG. 18. In the winding method shown in FIG. 18, the U-phase coil 58a is wound in order of T5, T14, T11, T8, and then T2, the start end thereof is led out to the UV line 36a, and the finish end thereof is led out to the WU line 36c. The V-phase coil 58b is wound in order of T3, T15, T12, T9, and then T6, the start end thereof is led out to the VW line 36b, and the finish end thereof is led out to the UV line 36a. The W-phase coil 58c is wound in order of T1, T13, T10, T7, and then T4, the start end thereof is led out to the WU line 36e, and the finish end thereof is led out to the VW line 36b. In the winding method shown in FIG. 18, the UV line 36a is led out from a slot between T5 and 16, the VW line 36b is led out from a slot between T3 and T4, and the WU line 36c is led out from a slot between T1 and T2. In this case, an angle between the adjacent tooth portions 54b is 360 degrees/15=24 degrees, and therefore the UV line 36a, the VW line 36b, and the WU line 36c can be led out from a range of 120 degrees. Owing to the configuration as described above, it becomes possible to reduce a space needed for arranging the UV line 36a, the VW line 36b, and the WU line 36c inside the motor housing 16.

In the above embodiment, the bush cutter 2 has the motor 14 of outer rotor type. Instead, the bush cutter 2 may have a motor of inner rotor type. Also in this case, the start end of the U-phase coil and the finish end of the V-phase coil, the start end of the V-phase coil and the finish end of the W-phase coil, and the start end of the W-phase coil and the finish end of the U-phase coil may be led out within a range of 200 degrees from the stator, whereby it becomes possible to reduce a space needed for arranging the motor power line inside the housing containing the motor.

In the above embodiment, the cord holder 18 is attached under the motor housing 16, and the cord holder 18 is rotated by the motor 14. Instead, a disk blade made of metal may be attached under the motor housing 16, and the disk blade may be rotated by the motor 14.

In the above embodiment, an embodiment of the bush cutter 2 has been described as an example of the electric working machine. However, the electric working machine may be a weed cutter, a chain saw, a circular cutter (cut-off saw), a sprayer, a spreader, a blower, a dust collector, or the like, or may be an electric tool such as a drill, a driver, or a circular saw.

What is claimed is:

1. An electric working machine comprising:
a motor including a stator, wherein
the stator includes: a stator core having a plurality of tooth portions radially extending along a radial direction; and a first coil, a second coil, and a third coil wound on the tooth portions and connected by a delta connection,
a start end of the first coil and a finish end of the second coil, a start end of the second coil and a finish end of the third coil, and a start end of the third coil and a finish end of the first coil are led out within a range of 200 degrees from the tooth portions,
the start end of the first coil and the finish end of the second coil are connected to a first pair of switching elements,
the start end of the second coil and the finish end of the third coil are connected to a second pair of switching elements, and
the start end of the third coil and the finish end of the first coil are connected to a third pair of switching elements.

2. The electric working machine according to claim 1, wherein
the stator further includes an insulator covering at least a part of the stator core, and
the insulator has a flat portion formed along the radial direction and a circumferential direction of the stator core.

3. The electric working machine according to claim 2, wherein
the insulator has a rib formed near a base of each tooth portion and protruding from the flat portion.

4. The electric working machine according to claim 2, wherein
the insulator has a cylindrical wall protruding from the flat portion.

5. An electric working machine comprising:
a motor including a stator, wherein
the stator includes: a stator core having a plurality of tooth portions radially extending along a radial direction; and a first coil, a second coil, and a third coil wound on the tooth portions,
a start end of the first coil and a finish end of the second coil, a start end of the second coil and a finish end of the third coil, and a start end of the third coil and a finish end of the first coil are led out within a range of 200 degrees from the tooth portions,
the start end of the first coil and the finish end of the second coil are led out from adjacent tooth portions,
the start end of the second coil and the finish end of the third coil are led out from adjacent tooth portions, and
the start end of the third coil and the finish end of the first coil are led out from adjacent tooth portions.

6. An electric working machine comprising:
a motor including a stator, wherein
the stator includes: a stator core having a total of only nine tooth portions radially extending along a radial direction; and a first coil, a second coil, and a third coil wound on the tooth portions, and
a start end of the first coil and a finish end of the second coil, a start end of the second coil and a finish end of the third coil, and a start end of the third coil and a finish end of the first coil are led out within a range of 200 degrees from the tooth portions.

7. An electric working machine comprising:
a motor including a stator, wherein
the stator includes: a stator core having a total of twelve tooth portions radially extending along a radial direction; and a first coil, a second coil, and a third coil wound on the tooth portions, and
a start end of the first coil and a finish end of the second coil, a start end of the second coil and a finish end of the third coil, and a start end of the third coil and a finish end of the first coil are led out within a range of 150 degrees from the tooth portions.

8. An electric working machine comprising:
a motor including a stator, wherein
the stator includes: a stator core having a total of fifteen tooth portions radially extending along a radial direction; and a first coil, a second coil, and a third coil wound on the tooth portions, and a start end of the first coil and a finish end of the second coil, a start end of the second coil and a finish end of the third coil, and a start end of the third coil and a finish end of the first coil are led out within a range of 120 degrees from the tooth portions.

9. An electric working machine comprising:

a motor including a stator;

a housing containing the motor; and a support pole connected to the housing, wherein the stator includes: a stator core having a plurality of tooth portions radially extending along a radial direction; and a first coil, a second coil, and a third coil wound on the tooth portions, the support pole includes a motor power line supplying power to the first coil, the second coil, and the third coil, and a start end of the first coil and a finish end of the second coil, a start end of the second coil and a finish end of the third coil, and a start end of the third coil and a finish end of the first coil are led out within a range of 200 degrees from the tooth portions, and are connected to the motor power line.

* * * * *